United States Patent [19]

Bocchinfuso

[11] Patent Number: 4,702,039

[45] Date of Patent: Oct. 27, 1987

[54] AUTOMOBILE WEATHERSTRIPPING

[75] Inventor: Peter Bocchinfuso, St. Catharines, Canada

[73] Assignee: Gencorp Inc., Akron, Ohio

[21] Appl. No.: 7,543

[22] Filed: Jan. 28, 1987

[51] Int. Cl.[4] .............................................. E06B 7/16
[52] U.S. Cl. ...................................... 49/490; 49/498; 24/555
[58] Field of Search ................. 49/491, 490, 497, 498, 49/496, 475; 24/289, 555

[56] References Cited

U.S. PATENT DOCUMENTS

| | | | |
|---|---|---|---|
| 2,969,252 | 1/1961 | Gruver | 49/498 |
| 3,126,590 | 3/1964 | Monti | 49/490 |
| 3,308,727 | 3/1967 | Hart | 49/498 |
| 3,638,359 | 2/1972 | Kruschwitz | 49/490 |
| 4,030,245 | 6/1977 | Yeomans | 49/490 |
| 4,308,302 | 12/1981 | Etter et al. | 49/496 |
| 4,603,899 | 8/1986 | Iwasa | 49/490 |

Primary Examiner—Kenneth J. Dorner
Assistant Examiner—Gerald A. Anderson

[57] ABSTRACT

A resilient weatherstrip for an automobile door is described as having a hollow, mushroom-shaped bulbous portion which is integral with a metal reinforced carrier that attaches to the flange of the automobile frame surrounding the door. The carrier has special fingers with stops for engaging abutments which project into the opening through which the flange passes as the carrier is mounted in the door opening. The flange pushes the fingers apart so that the stops will interlock with the abutments should the carrier attempt to leave the flange.

11 Claims, 3 Drawing Figures

AUTOMOBILE WEATHERSTRIPPING

BACKGROUND OF INVENTION

The invention relates to weatherstripping, especially resilient elastomeric weatherstripping that is used to seal the doors or decklid openings of automobiles. Suth weatherstripping is generally comprised of a hollow bulbous portion which acts to seal the space between to automobile parts, and an integrally formed device for holding the weatherstripping in place between the parts. The stiffness of the material and the wall thickness, shape and size of the bulbous portion all affect the closing of the doors or decklids.

U.S. Pat. Nos. 4,263,750 and 4,348,443 are typical of the many patents which disclose a bulbous portion which is hollow and has an oval or circular cross-section that is integral with a carrier which has angularly disposed tabs of fingers for holding onto a metal strip to which the carrier is secured. British Patent No. 2,163,470-A discloses a carrier which is somewhat like that of the invention, except that the abutments projecting into the opening of the carrier are designed to be overridden by the stops which are on the resilient fingers as indicated above. U.S. Pat. Nos. 4,030,245; 4,114,320 and 4,374,880 disclose similar bulbous portions and carriers. U.S. Pat. No. 2,969,252 discloses a bulbous portion with a vent for allowing the escapement of air from within the bulbous portion as it becomes distorted.

U.S. Pat. No. 3,126,590 discloses a refrigerator gasket which comprises two semi-circular bulbous portions, the outer portion having a thicker sidewall than the lower portion to apparently promote bending or collapse of the lower portion before the outer portion. U.S. Pat. Nos. 2,498,851 and 2,880,049 disclose bulbous portions with uniform thickness walls, so that bending of a desired area of the seal is probably accomplished by the shape of the bulbous portion.

The invention is directed to an improved weatherstrip with good sealing and wrapping around characteristics.

DESCRIPTION OF DRAWING

The following description of the invention will be better understood by having to the accompanying drawing, wherein.

DETAILED DESCRIPTION OF DRAWING

Figure 1:
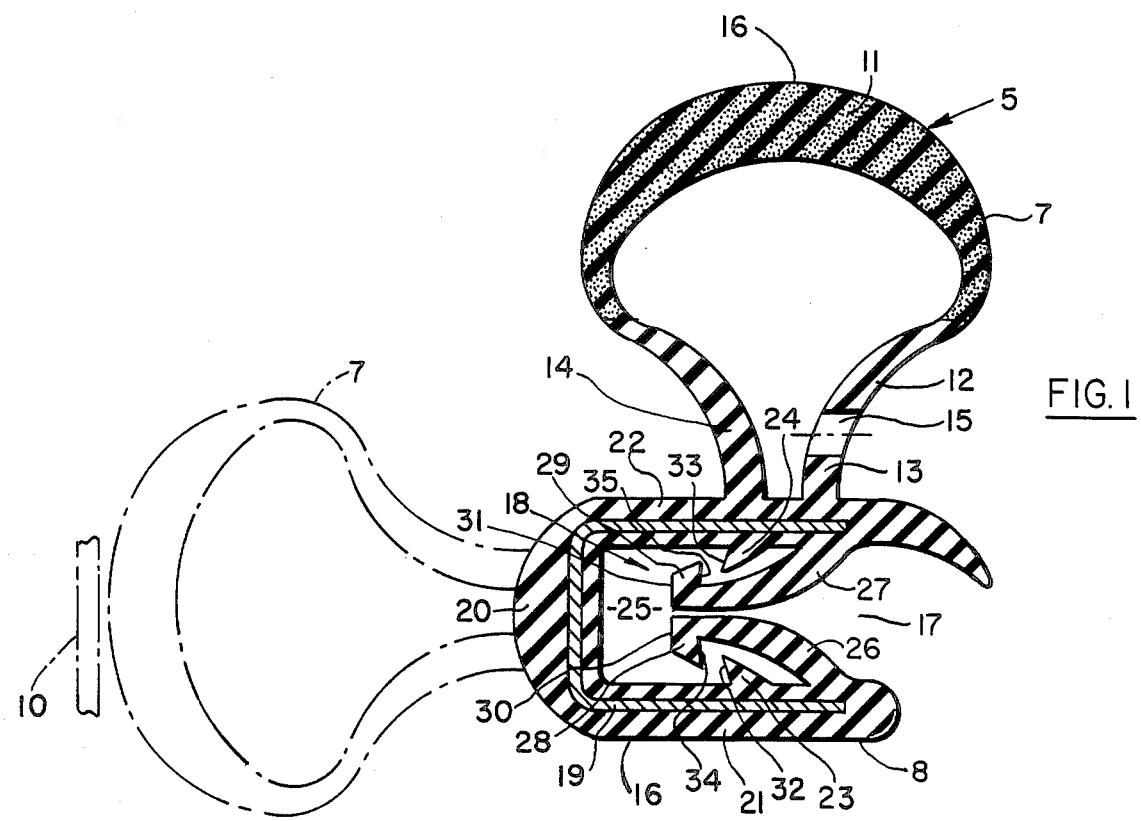
FIG. 1 is a section of a weatherstrip which is made in accordance with the invention.
Figure 2:
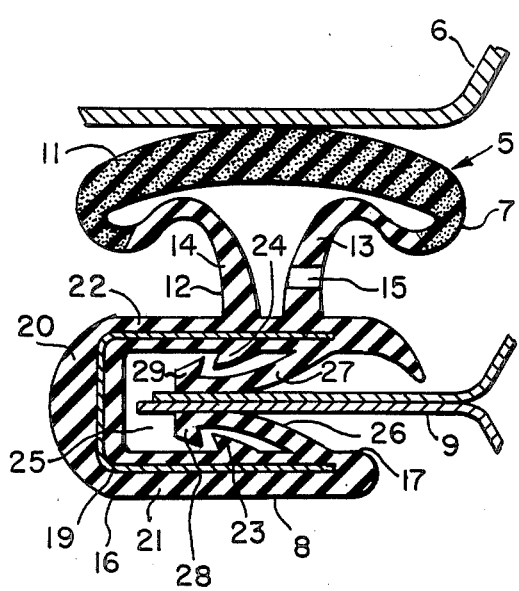
FIG. 2 is a similar section showing the sealing action of the weatherstrip with an automobile door.
Figure 3:
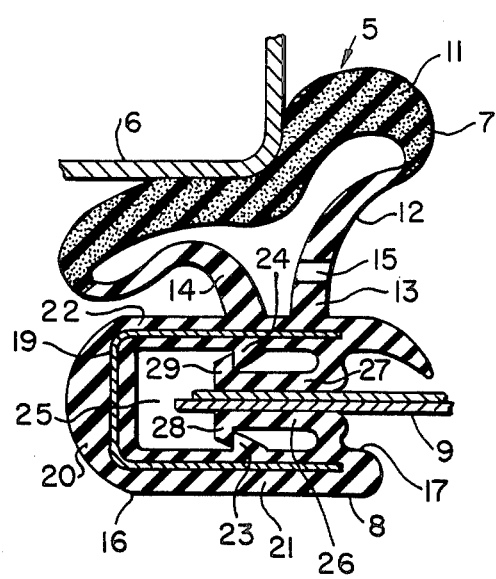
FIG. 3 is a similar section showing the wraparound effect of the bulbous portion of the weatherstrip and the retention of the carrier of the weatherstrip.

With reference to FIGS. 1-3, there is shown an elongated weatherstrip or seal 5 which, in this instance, is designed to be mounted around a car door opening to sealingly engage the car door 6 when it is rotated to a closed position. The seal 5 is composed of any suitable, resilient, elastomeric material, e.g. rubber. The seal 5 comprises a hollow, bulbous portion 7 which extends from a carrier portion 8 which is secured to a flange 9 of the car frame and holds the bulbous portion 7 in place for engaging the car door 6. The bulbous portion 7, shown in dotted line of FIG. 1, is positioned on the carrier portion 8 to engage an adjacent decklid 10, if such is desired.

The bulbous portion 7, in cross-section, is mushroom-shaped having an outwardly curved cap 11 and a stem 12 that consists of two separate legs 13, 14 which curved inwardly towards each other from the cap 11 to the carrier 8 and which increase in thickness as they approach the carrier 8. A plurality of similar apertures 15 are placed in the inner leg 13 closest the car frame, to allow the escapement of air from within the hollow bulb 7 to facilitate collapse of the bulb 7 and closing of the car door 6. The cap 11 increased in thickness from the legs 13, 14 to the peak 16 of the cap 11 midway between the legs 13, 14. The cap 11 is thicker than the legs 13, 14 of the stem 12, adjacent the cap 11, especially at the peak 16 of the bulb 7, i.e. the part of the bulb 7 farthest from the carrier 8. As seen in FIGS. 2 and 3, the complete collapse of the cap 11 will not affect the aperture 15 which, in some prior art seals, will close upon collapse or distortion of the bulb.

The carrier 8, in cross-section essentially comprises a U-shaped body 16 with an open end 17, and a mechanism 18 for compressively engaging and holding the flange 9 of the car frame, when the carrier 8 is mounted on the flange 9. A U-shaped piece 19 of metal is embedded in the body 16 to reinforce the closed end 20 and opposing, parallel sidewalls 21, 22 of the carrier 8. A pair of oppositely disposed abutments 23, 24 project from the sidewalls 21, 22 inwardly into the longitudinally extending space or opening 25 between the sidewalls 21, 22 in spaced relation from the open end 17 of the carrier 8. A pair of resilient fingers 26, 27 extend from the sidewalls 21, 22 adjacent the open end 17 inwardly towards the closed end 20 beyond the abutments 23, 24 to compressively engage the flange 9 of the door frame as the carrier 8 is mounted on the flange 9. A pair of stops 28, 29 are provided at the free distal ends 30, 31 of the fingers 26, 27 for interlocking engagement with the abutments 23, 24 should the carrier 8 attempt to pull away or escape from the flange 9, as seen in FIG. 2. The flange 9 pushes the fingers 26, 27 apart as it enters the opening 25 to bring the stops 28, 29 into alignment with the abutments 23, 24. Note that the engaging faces 32, 33 and 34, 35 of the abutments 23, 24 and stops 28, 29, respectively, are substantially parallel and at right angles to the longitudinal axis of the opening 25 to provide a positive interlock between the abutments and stops and a tighter gripping action of the mechanism 18.

Thus, there has been described a mushroom shaped bulbous portion which is integrally formed with a carrier which is provided with a pair of fingers for firmly gripping the flange of a car frame on which the carrier is desired to be mounted. The mushroom stem or legs for holding the mushroom cap are purposely made narrower where they engage the cap, so that they, and not the mushroom cap will initially deflect and become distorted uniformly under the cap, which, upon further compression, will be resisted by the substantially upright parallel legs in much the same way that a weight lifter's extended arms press weight to protect the seal from severe distortion and possible ruination. The mushroom cap has good wraparound characteristics, as shown in FIG. 3 of the drawing, because of the ease at which the resilient legs of the stem will adapt to forces imposed on the cap.

What is claimed is:

1. A resilient weatherstrip between two parts, one of which is stationary and the other of which is movable in relation thereto, comprising:
   (a) a hollow bulbous portion for compressively engaging the movable part as it moves towards the stationary part, the bulbous portion being mushroom shaped having cap and stem portions, the bulbous portion in cross-section including:
      (I) a cap portion which has an outer surface which is smoothly curved outwardly away from the stem portion; and
      (II) a stem portion which has a pair of spaced apart legs which curve inwardly towards each other from the cap portion in a direction away from the cap portion, the legs being thinnest adjacent to the cap portion and increasing in thickness as they extend from the cap portion which also increases in thickness from the legs to the peak of the cap portion and which is thicker than the legs adjacent the cap portion, so that the legs at their thinnest portion will bend more easily than the cap portion, one of the legs having at least one aperture therein for allowing the escapement of air from within the hollow bulbous portion; and
   (b) means for fastening the bulbous portion to the stationary part.

2. The weatherstrip of claim 1, wherein the means include:
   (b) a carrier for attachment to the stationary part, the carrier, in cross-section, including:
      (III) a generally U-shaped body with an open end in longitudinal spaced relation from a closed end, and a pair of opposing sidewalls extending from the closed end to the open end.
      (IV) a pair of abutments projecting from the sidewalls inwardly towards each other into the space between the sidewalls, the abutments each having a stop engaging face in spaced relation from the open end of the body.
      (V) a pair of fingers extending from the sidewalls adjacent the open end of the body inwardly towards the closed end of the body beyond the abutments and terminating at free distal ends, the fingers designed to compressively engage therebetween, a flange of the stationary part;
      (VI) a pair of stops at the free distal ends of the fingers for engaging the abutments when the carrier is mounted on a flange of the stationary part and the carrier attempts to leave the flange; and the abutments and stops having engaging faces which are substantially parallel and which are normal to the longitudinal axis of the space between the sidewalls of the body.

3. A resilient weatherstrip between two parts, one of which is stationary and the other of which is movable in relation thereto, comprising:
   (a) a carrier for attachment to the stationary part, the carrier, in cross-section, including:
      (I) a generally U-shaped body with an open end in longitudinal spaced relation from a closed end, and a pair of opposing sidewalls extending from the closed end to the open end:
      (II) a U-shaped piece of metal embedded in the closed end and sidewalls of the body;
      (III) a pair of abutments projecting from the sidewalls inwardly towards each other into the space between the sidewalls, the abutments each having a stop engaging face in spaced relation from the open end of the body.
      (IV) a pair of fingers extending from the sidewalls adjacent the open end of the body inwardly towards the closed end of the body beyond the abutments and terminating at free distal ends, the fingers designed to compressively engage therebetween, a flange of the stationary part;
      (V) a pair of stops at the free distal ends of the fingers for engaging the abutments when the carrier is mounted on a flange of the stationary part and the carrier attempts to leave the flange; and
   (b) a hollow bulbous portion extending from the carrier for compressively engaging the movable part when it moves towards the stationary part, the bulbous portion being mushroom shaped and including:
      (VI) a cap which has an outer surface that is smoothly curved outwardly in a direction away from the carrier; and
      (VII) a stem between the cap and the carrier, the stem comprising a pair of spread legs which curve inwardly towards each other from the cap to the carrier, the legs being thinnest adjacent the cap and uniformly increasing in thickness toward the carrier, the cap likewise increasing in thickness from the legs to the peak of the cap and being thicker than the legs adjacent the cap, so that the legs will more easily bend, and one of the legs having at least one aperture for allowing the escapement of air from within the hollow bulbous portion.

4. The weatherstrip of claim 3, wherein the abutments and stops have engaging faces which are substantially parallel to each other and normal to the longitudinal axis of the space between the sidewalls to provide a positive interlock between the abutments and stops.

5. The weatherstrip of claim 4, wherein the bulbous portion is normal to the carrier which is designed for attachment to a flange of an automobile frame adjacent a door opening.

6. The weatherstrip of claim 4, wherein the bulbous portion is axially aligned with the carrier which is designed for attachment to a flange of an automobile frame adjacent a decklid opening.

7. A resilient weatherstrip between two parts, one of which is stationary and the other of which is movable in relation thereto, comprising:
   (a) a carrier for attachment to the stationary part, the carrier, in cross-section, including:
      (I) a generally U-shaped body with an open end in longitudinal spaced relation from a closed end, and a pair of opposing sidewalls extending from the closed end to the open end;
      (II) a pair of abutments projecting from the sidewalls inwardly towards each other into the space between the sidewalls, the abutments each having a stop engaging face in spaced relation from the open end of the body;
      (III) a pair of fingers extending from the sidewalls adjacent the open end of the body and inwardly towards the closed end of the body beyond the abutments and terminating at free distal ends, the fingers designed to compressively engage therebetween, a flange of the stationary part;
      (IV) a pair of stops at the free distal ends of the fingers for engaging the abutments when the carrier is mounted on a flange of the stationary part and the carrier attempts to leave the flange; the abutments and stops having engaging faces which are substantially parallel to each other and normal to the longitudinal axis of the space between the sidewalls to provide a positive interlock between the abutments and the stops; and (b) a hollow bulbous portion extending from the carrier for compressively engaging the movable part when it moves toward the stationary part.

8. The weatherstrip of claim 7, which includes a U-shaped piece of metal embedded in the closed end and sidewalls of the carrier.

9. The weatherstrip of claim 8, wherein the bulbous portion is normal to the carrier which is designed for attachment to a flange of an automobile frame adjacent a door opening.

10. The weatherstrip of claim 8, wherein the bulbous portion if axially aligned with the carrier which is designed for attachment to a flange of an automobile frame adjacent a decklid opening.

11. The weatherstrip of claim 8, wherein the bulbous portion is mushroom shaped and includes; in cross section, (V) a cap portion which has an outer surface which is smoothly curved outwardly away from the stem portion; and (VI) a stem portion which has a pair of spaced apart legs which curve inwardly towards each other from the cap portion in a direction away from the cap portion, the legs being thinnese adjacent the cap portion and increasing in thickness as they extend from the cap portion which also increases in thickness from the legs to the peak of the cap portion and which is thicker than the legs adjacent the cap portion, so that the legs at their thinnest portion will bend more easily than the cap portion; one of the legs having at least one aperture therein for allowing the escapement of air from within the hollow bulbous portion.

* * * * *